(12) United States Patent
Kifuku et al.

(10) Patent No.: US 6,262,547 B1
(45) Date of Patent: Jul. 17, 2001

(54) MOTOR-DRIVEN POWER STEERING APPARATUS

(75) Inventors: Takayuki Kifuku; Shunichi Wada, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/000,838

(22) Filed: Dec. 30, 1997

(30) Foreign Application Priority Data

Aug. 7, 1997 (JP) .................................................. 9-213382

(51) Int. Cl.[7] .......................................................... H02P 7/00
(52) U.S. Cl. .......................... 318/432; 318/433; 318/282; 180/443; 180/446
(58) Field of Search ..................................... 180/443–446, 180/280, 282, 283, 286, 447; 318/434, 433, 432

(56) References Cited

U.S. PATENT DOCUMENTS

| | | | |
|---|---|---|---|
| 4,391,340 | * 7/1983 | DeLorean | 180/79.1 |
| 4,481,550 | * 11/1984 | Miller et al. | 318/616 |
| 4,860,844 | * 8/1989 | O'Neil | 180/79.1 |
| 4,893,689 | * 1/1990 | Laurich-Trost | 180/140 |
| 5,709,281 | * 1/1998 | Sherwin et al. | 180/272 |

* cited by examiner

*Primary Examiner*—David S. Martin
(74) *Attorney, Agent, or Firm*—Sughrue, Mion, Zinn, Macpeak & Seas, PLLC

(57) ABSTRACT

A motor-driven power steering apparatus comprises: a torque sensor for detecting a steering torque; an assist indicator for outputting an indication signal which indicates the direction and magnitude of an output torque of a motor power-assisting a steering mechanism; a dither signal generator for outputting a high-frequency dither signal; and a control circuit for controlling a current supplied to the motor according to the indication signal provided by the assist indicator and the dither signal provided by the dither signal generator.

14 Claims, 6 Drawing Sheets

MOTOR-DRIVEN POWER STEERING APPARATUS

BACKGROUND OF THE INVENTION

This invention relates to a motor-driven power steering apparatus, and more particularly to an improvement of a driver's steering feeling.

A motor-driven power steering apparatus has been disclosed, for instance, by Postexamined Japanese Patent Publication 3-42235/(1991). Its arrangement is as shown in FIG. 6.

In FIG. 6, reference numeral 1 designates an assist direction motor current indicating section. The assist direction motor current indicating section 1 comprises: a torque sensor 11 which detects the torsion torque of a steering shaft, and outputs a torque signal in proportion to the torsion torque as shown in FIG. 7; and an output torque value instruction function section 12 which, in response to the torque signal of the torque sensor 11, provides an assist direction motor current instruction value i according to a function as shown in FIG. 8.

Further in FIG. 6, reference numeral 2 designates a phase compensation section which outputs a signal proportional to the differential value of the torque signal of the torque sensor 11, the output signal of the section being added to the aforementioned torque signal; and 21, a phase compensation instruction function section which outputs a phase compensation current instruction value ip which, as shown in FIG. 9, changes continuously when the signal of the phase compensation section 2 is lower than a predetermined value, and is constant when the output signal of the phase compensation section is higher than the predetermined value. The phase compensation current instruction value ip is added to the assist direction motor current instruction value i of the output torque value indicating function section 21 to obtain an addition value. The addition value thus obtained is applied to a control circuit 3, to drive an electric motor 4, to power-assist a steering mechanism 5.

The aforementioned control circuit 3 comprises: a positive or negative discriminating section 31 which determines whether the addition value of the assist direction motor current instruction value i and the phase compensation current instruction value ip is positive or whether the addition value is negative; an absolute value conversion section 33 which obtains the absolute value |i+ip| of the above-described addition value; a motor drive section 32 which determines the direction of rotation of the motor 4 according to the output signal of the positive or negative value discriminating section 31 and drives the motor 4 in response to the current instruction value provided by the absolution value conversion section 33; and a duty control section 34 which compares a motor armature current detected by an armature current detecting section 35 with the current instruction value of the absolute value conversion section 33, to perform duty control.

The conventional motor-driven power steering apparatus operates as follows:

The phase compensation section 2 obtains a signal proportional to the differential value of the torque signal of the steering shaft. The assist direction motor current instruction value based on the addition signal of the aforementioned signal and the torque signal is added to the phase compensation current instruction signal which changes continuously when the output signal of the phase compensation section 2 is lower than the predetermined value, and is constant when it is higher than the predetermined value, to obtain the addition value. The addition value thus obtained is utilized to control the control section 3. This improves the motor power assistance follow-up characteristic (responsibility), and prevents the occurrence of self-oscillation at the time of rest steering, and absorbs the effect of the motor's inertial force when the vehicle is traveling at high speed, thus eliminating a sense of incongruity during steering.

In the above-described conventional motor-driven power steering apparatus, the motor 4 is driven according to the output of the torque sensor. Therefore, when the torsion torque is not applied, the motor 4 is not driven. Thereafter, when a steering operation is started, a torque loss occurs which attributes to the static friction of the motor and a steering mechanism, and therefore a great steering torque is necessary for the steering operation; that is, the driver feels unpleasant about the steering operation. In addition, when the steering wheel is released after the steering operation, the return of the steering wheel is obstructed by the friction of the motor and the steering mechanism; that is, it is rather difficult for the steering wheel to return to the neutral position (the straight movement of the vehicle).

SUMMARY OF THE INVENTION

Accordingly, an object of the invention is to eliminate the above-described difficulties accompanying a conventional motor-driven power steering apparatus.

More specifically, an object of the invention is to provide a motor-driven power steering apparatus in which the effect of the friction, particularly static friction, of the motor and the steering mechanism is eliminated, so that the driver may feel comfortable about the steering operation.

The foregoing object and other objects of the invention have been achieved by the provision of a motor-driven power steering apparatus which, according to the invention, comprises: a torque sensor for detecting a steering torque; assist indicating means for outputting an indication signal which indicates the direction and magnitude of an output torque of a motor power-assisting a steering mechanism; dither signal generating means for outputting a high-frequency dither signal; and control means for controlling a current supplied to the motor according to the indication signal provided by the assist indicating means and the dither signal provided by the dither signal generating means.

In the motor-driven power steering apparatus, the amplitude of the dither signal outputted by the dither signal generating means is so set that the output torque of the motor which is produced by the dither signal is equal to or smaller than a torque loss attributing to the friction of the steering mechanism.

A half period of the dither signal outputted by the dither signal generating means is equal to or longer than electrical response delay of the control means and shorter than mechanical response delay of the steering mechanism.

In a predetermined operating condition, the generation of the dither signal by the dither signal generating means is inhibited.

Furthermore, in the motor-driven power steering apparatus, when a vehicle speed is equal to or lower than a predetermined value, the generation of the dither signal is inhibited.

Moreover, in the apparatus, when the number of revolutions per minute of an engine is equal to or smaller than a predetermined value, the generation of the dither signal is inhibited.

In addition, when the number of revolutions per minute of the motor is equal to or larger than a predetermined value, the generation of the dither signal is inhibited.

When the armature current of the motor is equal to or larger than a predetermined value, the generation of the dither signal is inhibited.

When the output of the torque sensor is equal to or larger than a predetermined value, the generation of the dither signal is inhibited.

In the apparatus, the amplitude of the dither signal generated by the dither signal generating means is varied according to a vehicle operating condition.

Furthermore, in the apparatus, the amplitude of the dither signal may be varied according to the number of revolutions per minute of the motor.

Moreover, in the apparatus, the amplitude of the dither signal may be varied according to the armature current of the motor.

In addition, in the apparatus, the amplitude of the dither signal may be varied according to the output of the torque sensor.

In the apparatus, the dither signal generated by the dither signal generating means is a signal whose higher harmonic components have been attenuated.

The nature, utility and principle of the invention will be more clearly understood from the following detailed description and the appended claims when read in conjunction with the accompanying drawings.

DETAILED DESCRIPTION OF THE PREFERRED EMBODIMENTS

Preferred embodiment of the invention will be described with reference to the accompanying drawings.

First Embodiment

An example of a motor-driven power steering apparatus, which constitutes a first embodiment of the invention, will be described with reference to FIG. 1.

Figure 1:
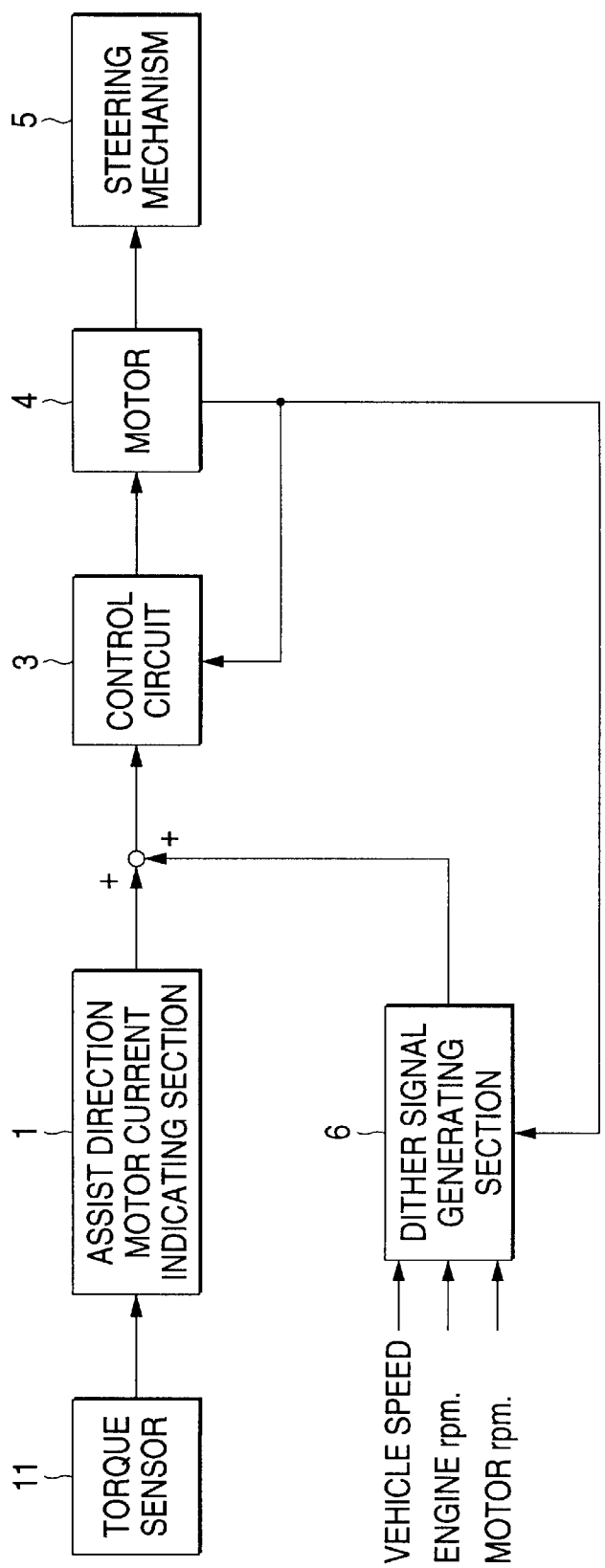
FIG. 1 is a block diagram showing the arrangement of an example of a motor-driven power steering apparatus, which constitutes an embodiment of the invention.

The motor-driven power steering apparatus, as shown in FIG. 1, comprises: an assist direction motor current indicating section 1; a control means, namely, a control circuit 3; and a steering mechanism 5.

Figure 7:
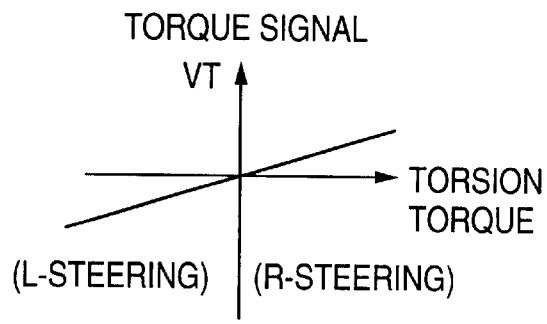
FIG. 7 is a characteristic diagram showing the output characteristic of a torque sensor.
Figure 8:
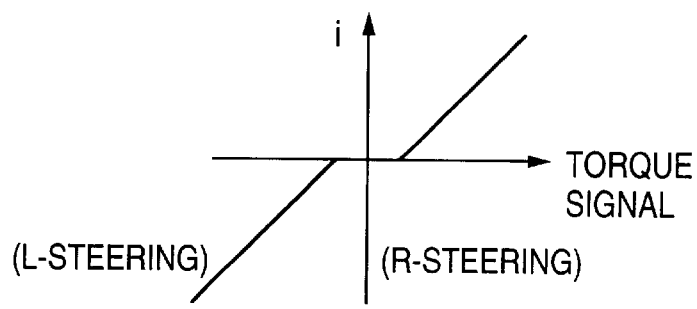
FIG. 8 is also a characteristic diagram indicating the characteristic of an output torque with respect to a torque sensor output.
Figure 9:
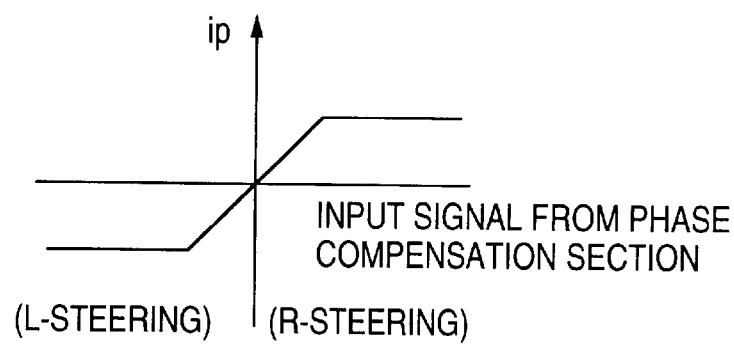
FIG. 9 is a characteristic diagram showing the phase compensation characteristic of a torque sensor output.

The assist direction motor current indicating section 1 includes: a torque sensor 11 which detects the torsion torque of a steering shaft, and outputs a torque signal proportional to the torsion torque as shown, for instance, in FIG. 7; and an output torque value instruction function section which, in response to the torque signal of the torque sensor 11, outputs an assist direction motor current instruction value according to a function as shown in FIG. 8. That is, the section 1 specifies the direction of rotation of the motor, and a current value necessary for obtaining necessary output torque, i.e., a target current value according to the torsion torque detected by the torque sensor 11.

The control circuit 3 comprises: a positive or negative value discriminating section which determines whether the addition value of the assist direction motor current instruction value and the phase compensation current instruction value is positive or whether the addition value is negative; an absolute value conversion section 33 which obtains the absolute value of the above-described addition value; a motor drive section which determines the direction of rotation of a motor 4 according to the output signal of the positive or negative value discriminating section and drives the motor 4 in response to the current instruction value provided by the absolute value conversion section; and a duty control section which compares an armature current detected by an armature current detecting section with the current instruction value of the absolute value conversion section, to perform duty control. That is, the control circuit 3 drives the motor 4 according to the indication provided by the assist direction motor current indicating section 1, a dither signal generating means, namely, a dither signal generating section 6, and the motor current flow in the motor armature.

The steering mechanism 5 is given an assist force by the motor 4 which is driven by the control circuit 3. The aforementioned dither signal generating section 6 receives various operating conditions such as vehicle speed, engine rpm., motor rpm., and armature current.

Now, the operation of the motor-driven power steering apparatus thus designed will be described.

Figure 2:
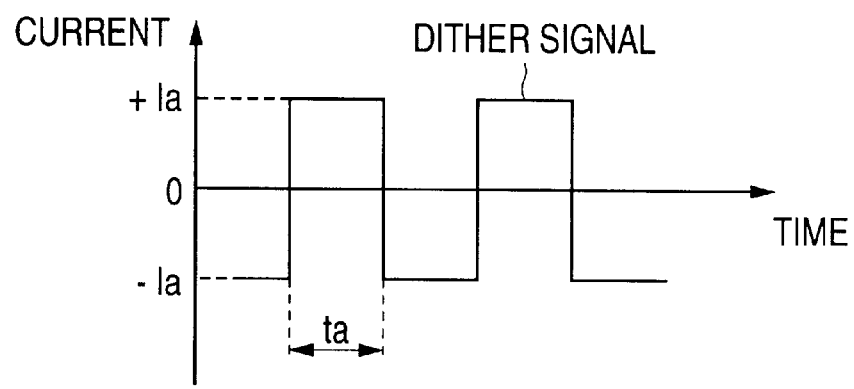
FIG. 2 is a waveform diagram showing a dither signal in the motor-driven power steering apparatus.
Figure 3:
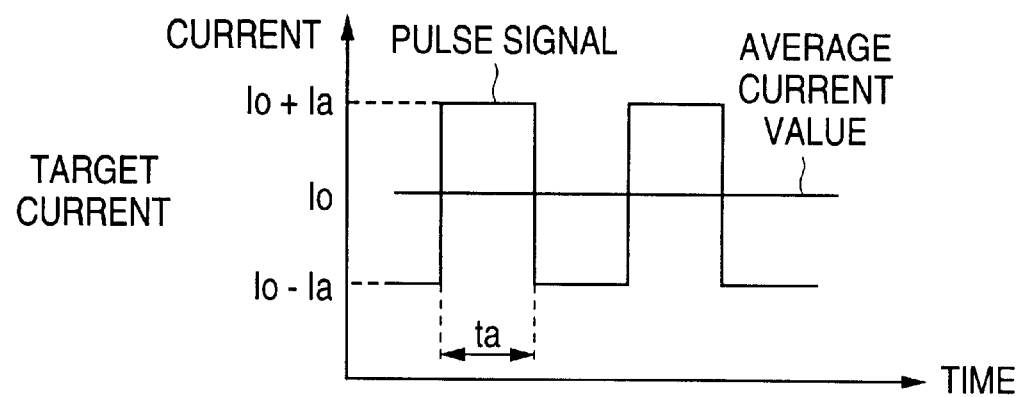
FIG. 3 is also a waveform showing the dither signal in the motor-driven power steering apparatus.

The dither signal is a high-frequency pulse signal as shown in FIG. 2. A pulse signal obtained by adding the dither signal to the indication of the assist direction motor current indicating section, namely, a target current value Io of the motor current is a pulse signal (Io±Ia) having an amplitude of ±Ia with respect to the target current value Io as shown in FIG. 3, and the average current is the target current value Io. The control circuit 3 utilizes the pulse signal, the sum of the target current value, and the dither signal, to drive the motor 4 (hereinafter referred to as "dither control", when applicable).

In the case where, in FIG. 3, the amplitude ±Ia of the dither signal is large, the output torque of the motor 4 becomes great, and the motor is rotated, and the steering mechanism itself is driven, so that the steering mechanism is vibrated right and left. In order to prevent the occurrence of the vibration, the amplitude ±Ia of the dither signal is set to a value with which the motor is not turned. More specifically, the amplitude of the dither signal is so set that the output torque of the motor 4 generated with the aid of the dither signal does not exceed the torque loss attributing to the static friction of the steering. Ideally, the output torque of the motor 4 is equal to the torque loss attributing to the static friction.

The dither control is performed with the dither signal whose amplitude has been set as described above. Therefore, the torque loss of the steering mechanism which is due to the static friction is canceled out by the output torque of the motor 4 which is generated by the dither control, and therefore at the start of a steering operation the effect of torque loss which is due to the static friction is eliminated; that is, the driver may feel comfortable about the steering operation. In addition, the vibration of the steering mechanism which is due to the dither signal can be prevented. When the steering wheel is released to return to the neutral position, the torque loss attributing to the friction of the steering mechanism is canceled out by the dither control, as a result of which the steering wheel is smoothly returned to the neutral position.

Second Embodiment

Another example of the motor-driven power steering apparatus, which constitutes a second embodiment of the invention, will be described.

In general, a motor-driven power steering apparatus suffers from electrical response delay and mechanical response delay. The electrical response delay is generally of the order of 2 to 3 msec, and the mechanical response delay is of the order of 30 to 50 msec; that is, the electrical response delay is much shorter than the mechanical response delay. In the case where, in FIG. 3, the half period ta (for instance, the time on the positive (+) side of the dither signal is shorter than the above-described electrical response delay, the motor 4 is not driven by the dither signal because, even if the dither signal is applied, the electrical circuit cannot respond thereto. In contrast, in the case where the half period ta is equal to or longer than the mechanical response delay, the steering mechanism itself responds thereto, so that the steering mechanism is vibrated being driven right and left every half period ta of the dither signal. Hence, the half period ta of the dither signal should be set equal to or more than the electrical response delay and shorter than the mechanical response delay.

In the case where the half period of the dither signal is set equal to or longer than the electrical response delay and shorter than the mechanical response delay (for instance 5 to 10 msec), the motor 4 is electrically driven right and left every half period of the dither signal; however, it is not mechanically driven; that is, it cannot respond thereto. Accordingly, the motor 4 is electrically driven, and the torque loss attributing to the static friction of the steering mechanism is canceled out. Hence, the steering torque required at the start of steering may be small, and the steering feeling is improved. In addition, since the steering mechanism is not mechanically driven, the vibration of the steering mechanism attributing to the dither signal can be prevented.

In the above-described second embodiment, the steering mechanism is not driven by the dither signal, and therefore it is unnecessary to make the output torque of the motor 4 generated by the dither control smaller than the friction torque loss, and a dither signal large in amplitude can be applied. By increasing the amplitude of the dither signal, the torque loss due to friction can be completely canceled out. Hence, the effect is enhanced that the steering torque required at the start of steering is small.

Third Embodiment

Another example of the motor-driven power steering apparatus, which constitutes a third embodiment of the invention, will be described. In the third embodiment, the dither control is inhibited according to an operating condition.

Similarly as in the second embodiment, the dither signal is a pulse signal whose half period is 5 to 10 msec. In application of the dither signal, the variation of torque due to the latter signal produces a vibration sound. However, while the vehicle is traveling at high speed or the engine is run at high speed, the driver does not care about the vibration sound, because the engine sound is louder than the vibration sound. Hence, in a predetermined operating (driving) condition (the vehicle speed is equal to or lower than 5 km/hour, the engine rpm. is equal to or smaller than the idling rpm., or the engine sound is relatively quiet), the generation of the dither signal in the dither signal generating means is inhibited thereby to inhibit the dither control. That is, in the case where the engine sound is not loud, the generation of vibration sound can be prevented; that is, the difficulty is eliminated that the vibration sound makes the driver feel uncomfortable.

In the above-described third embodiment, the generation of the dither signal in the dither signal generating means 6 is inhibited thereby to inhibit the dither control. The third embodiment may be modified with the same effect as follows: Gate means for blocking the transmission of the dither signal generated in the dither signal generating means 6 is provided, to inhibit the dither control.

Fourth Embodiment

As is apparent from the above description, an object of the dither control is to eliminate the effect of the friction of the motor and the steering mechanism, particularly the static friction thereof. This is most effective when the motor and the steering mechanism are at rest. Hence, when the driver is operating the steering wheel, the necessity for the dither control is decreased. In this case, by decreasing the amplitude of the dither signal, the torque variation due to the dither control can be prevented; that is, the steering feeling is much improved.

Figure 4A:
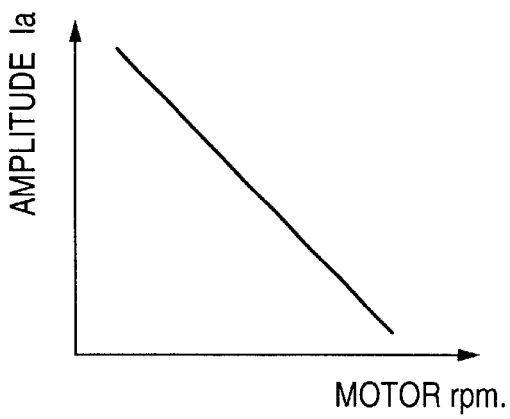
FIGS. 4A to 4C are characteristic diagrams showing characteristics of the dither signal.

As shown in FIG. 4A, as the motor rpm. increases, the amplitude of the dither signal is decreased. The state that the motor 4 rotates corresponds to the state that the driver applies the steering torque to the steering mechanism whereby the motor 4 is driven. The amplitude of the dither signal is varied according to the motor rpm. That is, in the case where the motor rpm. is small and the effect of the static friction is great, the dither control is carried out to eliminate the effect of the static friction; and in the case where the motor rpm. is large and the effect of the static friction is not great, the amplitude of the dither signal is made small, thereby to decrease the variation of the output torque of the motor. Thus, the steering operation is smoothly achieved.

Figure 4B:
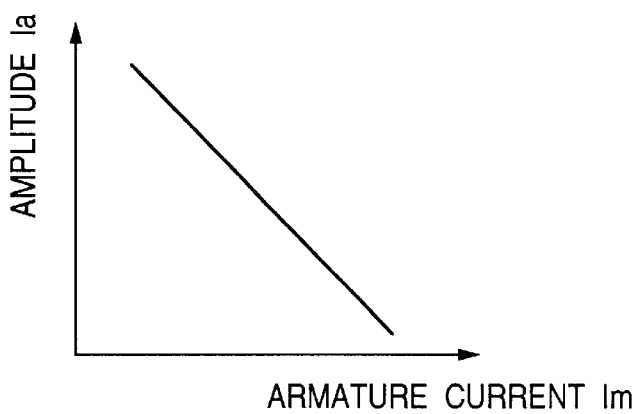
Figure 4C:
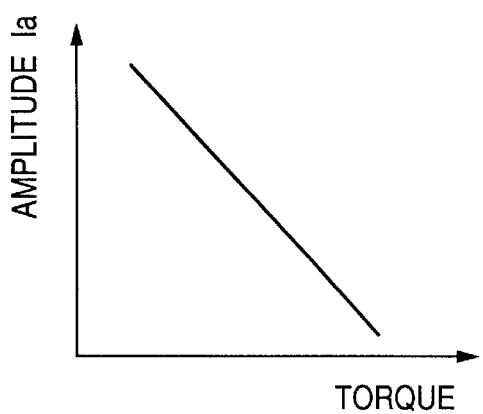

In the above-described fourth embodiment, the amplitude of the dither signal is varied according to the motor rpm. However, the same effect is obtained by modifying the embodiment in such a manner that the amplitude of the dither signal is varied according to the current Im flowing in the armature of the motor 4 as shown in FIG. 4B or the output of the torque sensor as shown in FIG. 4C.

Furthermore, in the above-described fourth embodiment, as the rpm. of the motor 4 increases, the amplitude of the dither signal is decreased. However, the same effect is obtained by modifying the embodiment in such a manner that the dither control is inhibited when the motor rpm. is equal to or more than a predetermined value. In addition, the same effect is obtained by modifying the embodiment in such a manner that, when the armature current Im or the output of the torque sensor 11 is equal to or more than a predetermined value, the dither control is inhibited.

Fifth Embodiment

In the above-described first through fourth embodiments, the dither signal is a pulse signal as shown in FIG. 2.

Figure 5A:
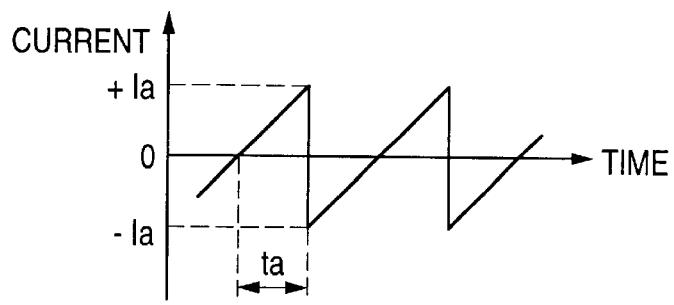
FIGS. 5A to 5C are waveform diagrams showing dither signals in other embodiments of the invention.
Figure 5B:
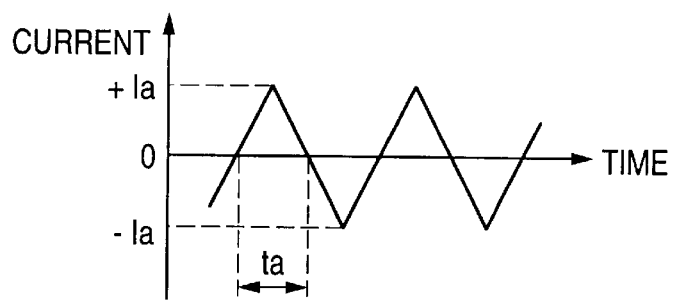
Figure 5C:
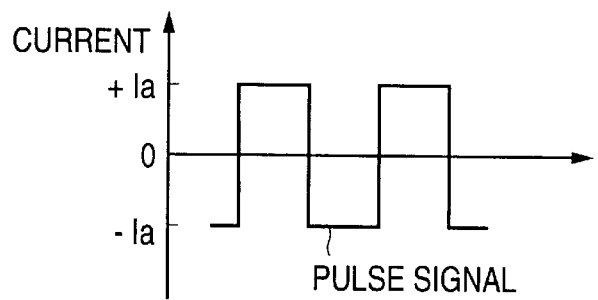
Figure 5C:
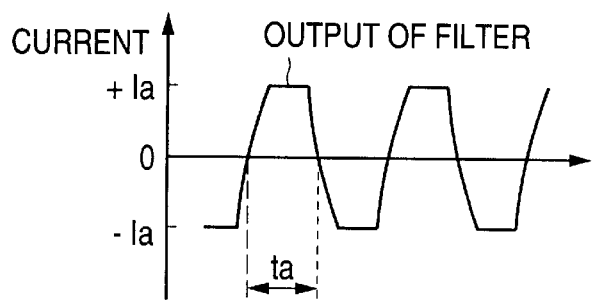
Figure 6:
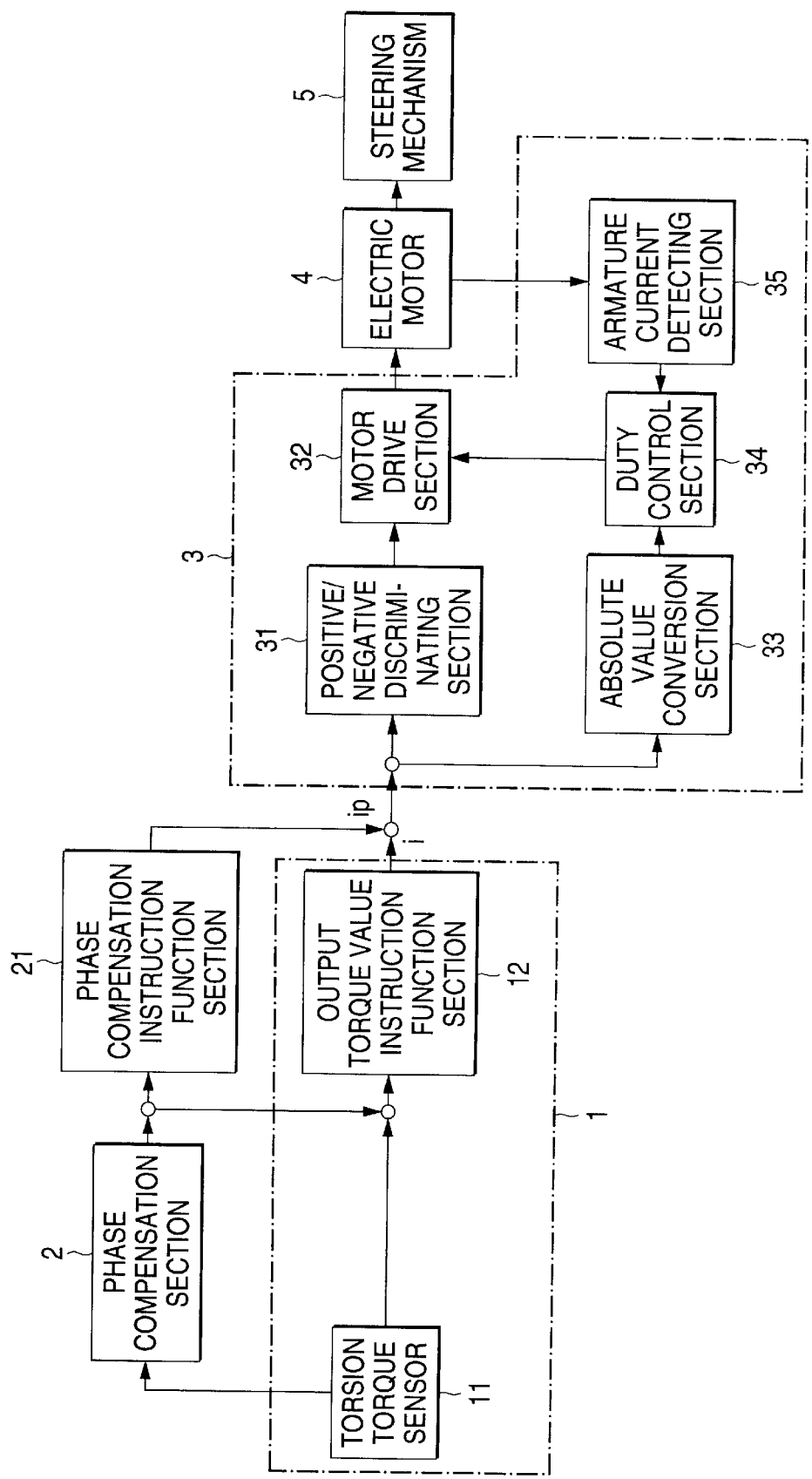
FIG. 6 is a block diagram showing the arrangement of a conventional motor-driven power steering apparatus.

However, instead of the pulse signal, a chopping wave as shown in FIG. 5A or a saw-tooth wave as shown in FIG. 5B may be employed. In this case, in the electrical circuit, the current is improved in response characteristic, the variation of the output torque of the motor 4 due to the dither control is smooth; that is, the vibration sound is decreased. Furthermore, instead of the chopping wave or the saw-tooth wave, a sine wave or a pulse signal may be employed with its higher harmonic components attenuated with a low-pass filter as shown in FIG. 5C.

As described above, the motor-driven power steering apparatus according to the present invention, comprises: the torque sensor for detecting a steering torque; the assist indicating means for outputting an indication signal which indicates the direction and magnitude of an output torque of a motor power-assisting a steering mechanism; the dither signal generating means for outputting a high-frequency dither signal; and the control means for controlling a current supplied to the motor according to the indication signal provided by the assist indicating means and the dither signal provided by the dither signal generating means, to perform the dither control. Hence, the torque loss attributing to the friction of the steering mechanism can be canceled out, and the steering torque required at the start of steering is small. Furthermore, when the steering wheel is released, the returning of the steering wheel to the neutral position is not obstructed. This means that the driver feels comfortable about the steering operation.

Furthermore, in the apparatus of the invention, the amplitude of the dither signal outputted by the dither signal generating means is so set that the output torque of the motor which is produced by the dither signal is equal to or smaller than a torque loss attributing to the friction of the steering mechanism. Hence, the vibration of the steering mechanism attributing to the dither signal is prevented, so that the steering feeling is improved.

A half period of the dither signal outputted by the dither signal generating means is equal to or longer than electrical response delay of the control means and shorter than mechanical response delay of the steering mechanism. Hence, the vibration of the steering mechanism attributing to the dither signal is prevented, and the torque loss due to the friction of the steering mechanism can be more efficiently canceled out, so that the steering feeling is improved as much.

In a predetermined operating condition, the generation of the dither signal by the dither signal generating means is inhibited. Hence, the vibration attributing to the dither control is prevented, and the generation of vibration sound is suppressed, so that the difficulty is eliminated that driver feels uncomfortable about the vibration sound. In addition, the steering operation is smoothly carried out.

Furthermore, in the motor-driven power steering apparatus, when the vehicle speed is equal to or lower than a predetermined value, the generation of the dither signal is inhibited. That is, only when the engine sound is loud, the dither control is carried out. This feature eliminates the difficulty that the drivers feels unpleasant about the vibration sound attributing to the dither control.

Moreover, in the motor-driven power steering apparatus, when the number of revolutions per minute of an engine is equal to or smaller than a predetermined value, the generation of the dither signal is inhibited. This feature eliminates the difficulty that the drivers feels unpleasant about the vibration sound attributing to the dither control.

In addition, when the number of revolutions per minute of the motor is equal to or larger than a predetermined value, the generation of the dither signal is inhibited; that is, when the driver is performing the steering operation, the dither control is inhibited, so that he can smoothly achieve the steering operation.

Furthermore, when the armature current of the motor is equal to or larger than a predetermined value, the generation of the dither signal is inhibited, so that when the driver is performing the steering operation, the dither control is inhibited. In this case, too, he can smoothly achieve the steering operation.

Moreover, when the output of the torque sensor is equal to or larger than a predetermined value, the generation of the dither signal is inhibited, so that, when the driver is performing the steering operation, the dither control is inhibited. In this case, too, he can smoothly achieve the steering operation.

On the other hand, in the motor-driven power steering apparatus of the invention, the amplitude of the dither signal generated by the dither signal generating means is varied according to a vehicle operating condition. This feature makes it possible to perform the dither control according to the driver's steering condition, and therefore he can smoothly achieve the steering operation.

Furthermore, the amplitude of the dither signal may be varied according to the number of revolutions per minute of the motor. In this case, too, it is possible to perform the dither control according to the driver's steering condition, and therefore he can smoothly achieve the steering operation.

Moreover, the amplitude of the dither signal may be varied according to the armature current of the motor. Similarly as in the above-described case, it is possible to perform the dither control according to the driver's steering condition, and therefore he can smoothly achieve the steering operation.

In addition, the amplitude of the dither signal may be varied according to the output of the torque sensor. In this case, too, it is possible to perform the dither control according to the driver's operating-condition, and the steering feeling is improved.

Furthermore, in the apparatus, the dither signal generated by the dither signal generating means is a signal whose higher harmonic components have been attenuated. Hence, the response of current to the dither signal is improved, and the torque variation is decreased. Hence, the vibration sound is decrease, so that the difficulty is eliminated that the driver feels uncomfortable about the vibration sound.

What is claimed is:

1. A motor-driven power steering apparatus comprising:
   a torque sensor for detecting a steering torque and outputting a signal;
   assist indicating means for inputting said torque sensor signal and outputting an indication signal which indicates the direction and magnitude of an output torque of a motor power-assisting a steering mechanism;
   dither signal generating means for outputting a dither signal; and
   control means for controlling a current supplied to said motor according to said indication signal provided by said assist indicating means and said dither signal provided by said dither signal generating means;
   wherein the amplitude of said dither signal outputted by said dither signal generating means is always set so that the output torque of said motor which is produced by said dither signal is equal to or smaller than a torque loss attributable to the friction of said steering mechanism.

2. A motor-driven power steering apparatus as claimed in claim 1, wherein a half period of said dither signal outputted by said dither signal generating means is equal to or longer than electrical response delay of said control means and shorter than mechanical response delay of said steering mechanism.

3. The apparatus as claimed in claim 2, wherein said setting of the dither signal amplitude is adjusted so that the output torque of the motor is equal to the torque loss attributable to said friction.

4. A motor-driven power steering apparatus as claimed in claim 1, wherein when a vehicle is in a predetermined operating condition, the generation of said dither signal by said dither signal generating means is inhibited.

5. A motor-driven power steering apparatus as claimed in claim 4, wherein when a vehicle speed is equal to or lower than a predetermined value, the generation of said dither signal is inhibited.

6. A motor-driven power steering apparatus as claimed in claim 5, wherein when the number of revolutions per minute of an engine is equal to or smaller than a predetermined value, the generation of said dither signal is inhibited.

7. A motor-driven power steering apparatus as claimed in claim 4, wherein when the number of revolutions per minute of said motor is equal to or larger than a predetermined value, the generation of said dither signal is inhibited.

8. A motor-driven power steering apparatus as claimed in claim 4, wherein when the armature current of said motor is equal to or larger than a predetermined value, the generation of said dither signal is inhibited.

9. A motor-driven power steering apparatus as claimed in claim 4, wherein when the output of said torque sensor is equal to or larger than a predetermined value, the generation of said dither signal is inhibited.

10. A motor-driven power steering apparatus as claimed in claim 1, wherein the amplitude of said dither signal generated by said dither signal generating means is varied according to a vehicle operating condition.

11. A motor-driven power steering apparatus as claimed in claim 10, wherein the amplitude of said dither signal is varied according to the number of revolution per minute of said motor.

12. A motor-driven power steering apparatus as claimed in claim 10, wherein the amplitude of said dither signal is varied according to the armature current of said motor.

13. A motor-driven power steering apparatus as claimed in claim 10, wherein the amplitude of said dither signal is varied according to the output of said torque sensor.

14. A motor-driven power steering apparatus as claimed in claim 1, wherein said dither signal generated by said dither signal generating means is a signal whose higher harmonic components have been attenuated.

* * * * *